B. CHURCHILL.
Scale Beam.

No. 60,858. Patented Jan. 1, 1867.

Witnesses:
Samuel N. Piper
George Andrews

Inventor:
Benjamin Churchill.
by his attorney
R. H. Eddy

United States Patent Office.

BENJAMIN CHURCHILL, OF WAREHAM, MASSACHUSETTS.

Letters Patent No. 60,858, dated January 1, 1867.

IMPROVEMENT IN WEIGHING APPARATUS.

*The Schedule referred to in these Letters Patent and making part of the same.*

TO ALL PERSONS TO WHOM THESE PRESENTS SHALL COME:

Be it known that I, BENJAMIN CHURCHILL, of Wareham, in the county of Plymouth, and State of Massachusetts, have invented an improved Weighing Apparatus; and do hereby declare the same to be fully described in the following specification, and represented in the accompanying drawings, of which—

The said weighing apparatus is analogous to that patented by me by Letters Patent, No. 49,377, dated August 15, A. D. 1865.

Figure 1:
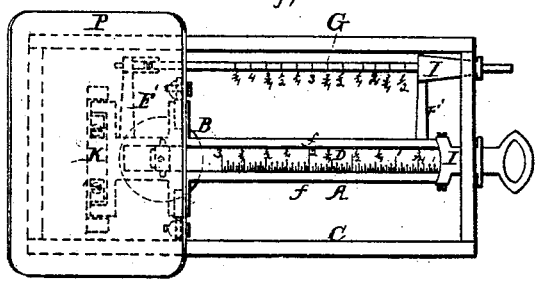
Figure 1 is a top view of it as it appears with the cover of its case removed from the body or rest of the case.
Figure 3:
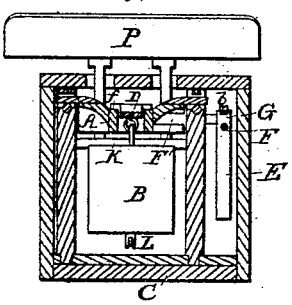
Figure 3 is a transverse section taken through the fulcra of the said weighing lever.
Figure 2:
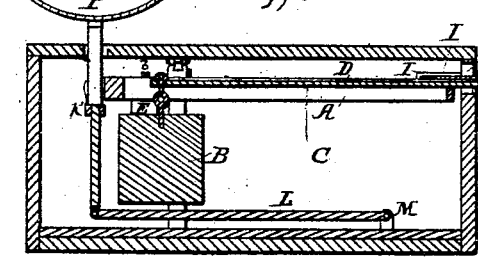
Figure 2 is a longitudinal and central section of it.
Figure 4:
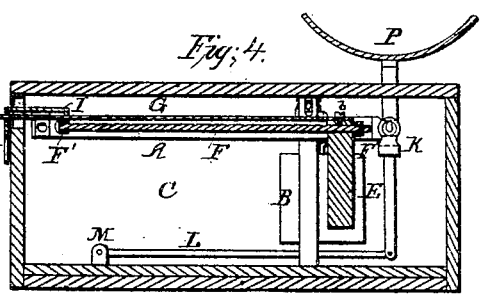
Figure 4 is a longitudinal section taken through the auxiliary weight its supporting and scale rods.

In carrying out my present invention, I have combined with the sliding weight B, and the duplex lever beam A, in which it is supported, a scale bar, D, to project from the weight B, and between the two beams $f f$ of the lever; such scale bar D being extended through a hole, $a$, in the end of the case C. This scale bar has a series of divisions and figures on it to indicate the weights which from time to time may be placed in the scale pan. There is also an auxiliary weight, E, supported by a notched rod, F, arranged parallel to the main scale, and upheld by two arms, F' F', projecting therefrom. To the said auxiliary weight, a scale bar, G, is attached near one of its ends by a screw, $b$, whose point or lower end is formed to rest in either of the notches of the notched rod F. Each of the said scale bars D G, runs through an eye-piece or guide, I, one of such eye-pieces or guides being fixed to the duplex lever beams, and the other to the notched rod or one of its supporting arms. Each eye-piece extends through a hole or slot made in the end of the case, as shown in figs. 2 and 4. There should be a scale of divisions and figures on the upper surface of the auxiliary scale bar G. By taking hold of such bar G, and moving it lengthwise, we at the same time cause the auxiliary weight to move on its supporting rod. The scale pan or platform is shown at P, as upheld by a lever, K, which is jointed to the rear end of the beam A, and at its foot to a long rod, L. The said rod L at its front end is jointed to a short post, M. Either of the scale bars D G serves not only to effect the movement of its weight, but to indicate the weight of an article on the pan, the division next to the guide of such scale bar being that which represents such weight.

With my improvement, the main weighing beam and most of the weighing apparatus may be enclosed in a covered box by which it will be preserved from injury and dust. The auxiliary weight, its notched rod, and scale bar, serve to indicate weights which would be fractional parts of that denoted by any divisional space of the main scale beam bar. Such auxiliary weight, and its supporting rod and scale bar, also answer for other useful purposes which will be well understood by persons skilled in the art to which my invention appertains.

What I claim as my invention and improvement in the above-described weighing apparatus, is connecting the auxiliary rod or beam F to the main beam by means of the arms F' F', each side of the axis of motion of the beam, so that the poise on the auxiliary beam may be traversed across the axis of the beam, outside of or beyond the axis of the beam, substantially as described.

BENJAMIN CHURCHILL.

Witnesses:
R. H. EDDY,
F. P. HALE, Jr.